US007610206B2

(12) United States Patent
Kuhlmann et al.

(10) Patent No.: US 7,610,206 B2
(45) Date of Patent: Oct. 27, 2009

(54) PROVISION OF CUSTOM CONFIGURED ASSEMBLIES

(75) Inventors: Charles Edward Kuhlmann, Raleigh, NC (US); Francis E Noel, Jr., Durham, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1814 days.

(21) Appl. No.: 10/063,814

(22) Filed: May 15, 2002

(65) Prior Publication Data
US 2004/0054635 A1    Mar. 18, 2004

(51) Int. Cl.
*G06Q 10/00* (2006.01)
(52) U.S. Cl. .......................................... 705/1
(58) Field of Classification Search ................. None
See application file for complete search history.

(56) References Cited

U.S. PATENT DOCUMENTS 6,167,383 A * 12/2000 Henson ....................... 705/26

7,035,815 B1 * 4/2006 Henson ....................... 705/26

OTHER PUBLICATIONS

Dell.com, Apr. 13, 2001, http://web.archive.org/web/20010413083142/www.dell.com/us/en/gen/default.htm.*
Wayback Machine, http://www.archive.org/index.php, to retrieve http://web.archive.org/web/*/http://dell.com.*
Dell.com, Homepage http://web.archive.org/web/20010413083142-www.dell.com/us/en/gen/default.htm.*

* cited by examiner

*Primary Examiner*—Janice A. Mooneyham
*Assistant Examiner*—Gerardo Araque, Jr.
(74) *Attorney, Agent, or Firm*—Patrick J. Daugherty; Driggs, Hogg, Daugherty & Del Zoppo Co., LPA

(57) ABSTRACT

Provision to a customer of equipment already installed into a specified enclosure to create an assembly is accomplished in an advantageous manner by the disclosed process. A manufacturer obtains the enclosure and the components of the specified equipment, installs the equipment in the enclosure and performs appropriate tests on the completed assembly before sending the assembly to the customer.

13 Claims, 1 Drawing Sheet

PROVISION OF CUSTOM CONFIGURED ASSEMBLIES

BACKGROUND OF INVENTION

Customers of many different types of equipment may have unique physical mounting requirements for the equipment. It can be the case that the customer has a specific type and size of enclosure into which the customer-requested equipment must be installed. Examples of such situations include communications equipment, general-purpose electronic equipment and computer equipment such as computer networking devices, network attached storage devices and general-purpose computing equipment. Each of these types of devices, and many more that will easily be identified by those skilled in the art, can be installed into a custom-designed enclosure, such as a rack assembly. These enclosures can be designed to fit specific customer applications. They may be designed to fit into certain centralized locations in a customer facility, to fit together in some way for ease of installation and maintenance, or to meet other specific, physical requirements of the customer.

Such a situation creates difficulty and added expense for several reasons. The various components making up the equipment to be installed in the enclosure may come from different suppliers. Specialized skills may be required to install the equipment in the enclosure and verify the functionality of the assembly. The customer location may be thousands of miles away from the various manufacturers of the components and, in fact, the customer may have several widely-separated locations at which it wishes to receive the completed assemblies.

The current solution to this problem requires the customer to obtain the necessary enclosure(s) at the desired locations and order or otherwise obtain the equipment to be installed. Skilled technicians must then travel to the customer location(s) to install the equipment into the enclosure(s) and test it for safety compliance and functionality. This process is unwieldy and expensive, adding time and expense where the customer can ill afford either.

For these reasons, and others readily identified by those skilled in the art, it would be desirable to a customer to simplify the process of obtaining equipment installed in a custom assembly, tested and ready to operate.

SUMMARY OF INVENTION

The present invention contemplates a process whereby a customer may be provided with requested equipment, already installed into a specified physical device, hereinafter referred to as an enclosure, and tested as an assembly, at a customer location. This process does not require that the customer separately order the enclosure and the various equipment components, nor does it require that skilled technicians travel to the customer location(s) to perform the installation and testing. In realizing these and other purposes of the present invention, a fulfillment process calls for a manufacturer to obtain or receive a customer-requested enclosure at a manufacturer location, install customer-requested equipment in the enclosure and test the assembly before sending the assembly to the customer.

BRIEF DESCRIPTION OF DRAWINGS

Some of the purposes of the invention having been stated, others will appear as the description proceeds, when taken in conjunction with the accompanying drawing, in which.

DETAILED DESCRIPTION

Figure 1:
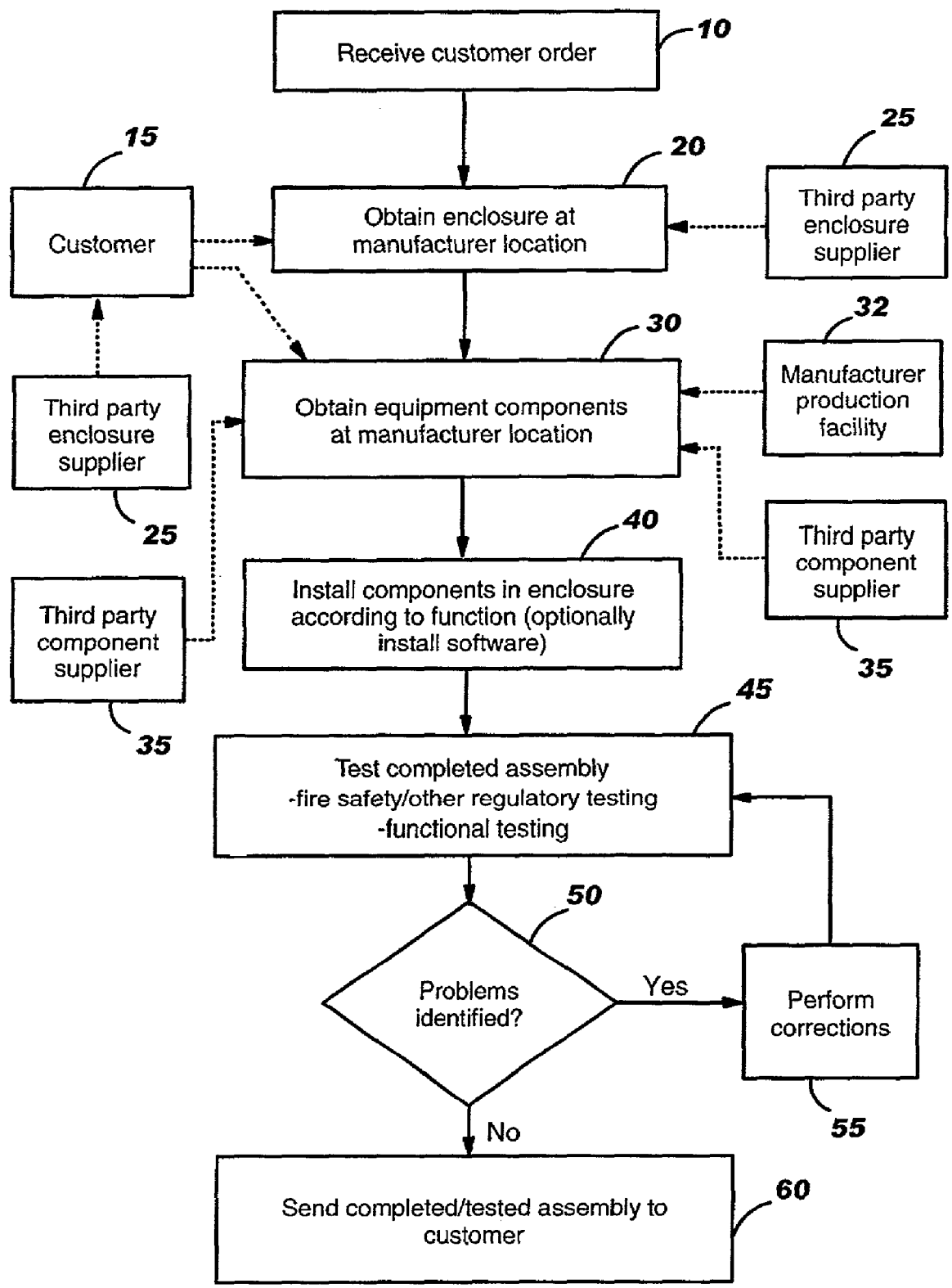
FIG. 1 is a graphical representation of a process according to a preferred embodiment of the present invention.

While the present invention will be described more fully hereinafter with reference to the accompanying drawing, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

In accordance with this invention, a customer contacts a manufacturer with an order for equipment. The equipment contemplated by this invention includes all types of electronic equipment, communications equipment and computer equipment such as network attached storage devices, networking equipment or general purpose computing devices. This invention can also be applied to any other types of equipment which can be advantageously installed into custom enclosures, as identified by those skilled in the respective arts.

The customer's order may cover equipment which includes several components. These components may be produced by the manufacturer but, in other situations, some or even all of the components may be produced by others and obtained by the manufacturer as a result of the customer's order. The manufacturer may operate for the convenience of the customer as an order-entry point, a gatherer and assembler of the components and a tester of the assembly. As one example, a customer may order routing equipment including an uninterruptible power suppler (UPS) from one supplier, a network management console from another supplier and a network router from still another supplier (or the manufacturer). In other circumstances, the manufacturer may, in fact, produce all of the requested components and assemble them as ordered by the customer. Finally, the customer's order may include specification of one or more components to be supplied by the customer itself. In such an instance, in connection with the order, the customer would ship or otherwise provide the appropriate quantity of the component(s) to be supplied by the customer at the manufacturer's location.

In accordance with the present invention, the customer's order will also include a specification of an enclosure into which the equipment is to be installed. Many types of modern equipment are designed to be assembled and interconnected in specially developed enclosures, such as rack assemblies which exist for many types of computer and networking systems. These enclosures may be of standardized physical dimensions to help ease space planning. They may also provide useful infrastructure for the equipment, such as interconnecting wiring, centralized provision of electrical power, etc. In some cases, though the equipment may not be especially designed for use in such an enclosure, a customer may nevertheless develop or desire such an enclosure-assembled solution. The customer may make this request in one of several different ways. The customer may provide the enclosures at the manufacturer's location by shipping them to the manufacturer or having the supplier of the enclosures ship them directly to the manufacturer. Or, the customer may simply inform the manufacturer of the type of enclosure desired, and possibly the supplier of such enclosures, and leave it to the manufacturer to obtain them on its own. Finally, the customer may provide the manufacturer with a set of functional and physical specifications for the enclosures and expect the manufacturer to obtain them in the most advantageous manner.

Upon receiving the customer's order and gathering the requested components from their respective sources as described above, the manufacturer assembles the components together in the requested enclosure. Depending on the type of equipment and enclosure involved, this process may involve electrical interconnection of the equipment in and to the enclosure, physical mounting of the components, and appropriate routing and connection of data and/or communication lines. In the case of computer equipment, such an assembly may also require the installation of customer-specified software.

In accordance with the present invention, once the components have been assembled in the enclosure, the manufacturer performs the testing necessary to ensure the assembly is ready for operation. In the case of many types of electrical equipment, there may be fire safety and other regulatory testing that must be performed by the manufacturer. In addition, the manufacturer performs the testing necessary to ensure the assembly performs according to its defined purpose. In the case of computer equipment, this might involved hardware as well as software testing.

Once such testing, and any modifications or repairs identified during such testing, has been completed, the manufacturer ships or otherwise delivers the finalized assembly to the customer location specified in the customer's order. The customer's order will likely be for some quantity of assemblies greater than one, in which case the manufacturer simply repeats the described process as many times as necessary to produce the requested number of completed and tested assemblies. Also, the customer's order may specify more than one customer location for delivery of various quantities of the completed assemblies; in which case the manufacturer must ensure the proper quantities are delivered to the proper customer locations. The delivery and receipt of the customer's orders, the internal management and coordination of such orders by the manufacturer and the delivery of the completed assemblies can all be carried out using conventional methods and techniques.

Referring now to FIG. 1 wherein one embodiment of the process described above is graphically represented, at 10 the manufacturer receives an order from a customer 15 specifying equipment to be installed in a custom enclosure. At 20, the manufacturer obtains the enclosures according to the customer's order. As shown by the dotted lines from the customer 15 and the third-party enclosure supplier 25 and as described above, the manufacturer may obtain the enclosures from the customer, who may have obtained them from the third-party enclosure supplier 25, or directly from the third-party enclosure supplier 25. Third party enclosure supplier 25 may be identified specifically by customer 15 or may be determined by the manufacturer according to enclosure specifications provided by customer 15.

At 30, the manufacturer obtains all of the components of the equipment specified in customer's order. As shown by the dotted lines from the customer 15, the manufacturer's production facilities 32 and the third-party suppliers 35 and as described above, the manufacturer will obtain the components from these various sources as necessitated by the customer's order. At 40, the manufacturer assembles the components and installs them in the enclosure according to the function of the components and their physical interaction with the enclosure. If the components include computer equipment, this assembly may include the installation of appropriate software.

After assembly, the manufacturer tests the assembly at 45. These tests may include fire safety and other regulatory testing as well as functional verification testing. If the components include computer equipment, this testing will include hardware as well as software testing. If the manufacturer determines 50 that the testing identified necessary repairs or corrections, the manufacturer performs such repairs or corrections at 55 and repeats the testing 45. Once the testing is completed successfully, the finalized and tested assembly is sent 60 to the location specified in the customer's order.

As readily recognized by those skilled in the art, the exact order of these process steps may be varied in any advantageous manner without deviating from the present invention. Also, where appropriate, steps may be repeated in order to produce and ship the quantity of assemblies specified in the customer's order.

In the drawing and specification there has been set forth a preferred embodiment of the invention, and, although specific terms are used, the description thus given uses terminology in a generic and descriptive sense only and not for purposes of limitation.

The invention claimed is:

1. A method for providing a customer with equipment installed in a rack assembly, the method comprising:
   providing the rack assembly at a manufacturer location;
   installing the equipment in the rack assembly to create an assembly, wherein the equipment includes an uninterruptible power supplier, a network management console, a network router, and a network server;
   testing the assembly; and
   sending the assembly to the customer.

2. The method of claim 1 wherein the providing step comprises receiving the rack assembly from the customer.

3. The method of claim 1 wherein the providing step comprises obtaining the rack assembly from a supplier specified by the customer.

4. The method of claim 1 wherein the providing step comprises obtaining the rack assembly according to specifications provided by the customer.

5. The method of claim 1 wherein the equipment comprises parts originating from the manufacturer.

6. The method of claim 1 wherein the equipment comprises at least one part originating from the manufacturer and at least one part originating from a source other than the manufacturer.

7. The method of claim 1 wherein the equipment comprises parts originating from a source other than the manufacturer.

8. The method of claim 6 wherein the at least one part originating from a source other than the manufacturer is supplied by the customer.

9. The method of claim 7 wherein at least one part is supplied by the customer.

10. The method of claim 1 wherein the testing step comprises performing fire safety testing.

11. The method of claim 1 wherein;
    the installing step further comprises loading appropriate software onto the equipment; and
    the testing step comprises performing functionality testing on the equipment and the loaded software.

12. The method of claim 1 further comprising: repeating the steps to create and test a number of assemblies requested by the customer.

13. The method of claim 12 wherein the sending step comprises sending the assemblies to more than one customer location.

* * * * *

UNITED STATES PATENT AND TRADEMARK OFFICE
CERTIFICATE OF CORRECTION

PATENT NO. : 7,610,206 B2
APPLICATION NO. : 10/063814
DATED : October 27, 2009
INVENTOR(S) : Kuhlmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2650 days.

Signed and Sealed this

Twelfth Day of October, 2010

David J. Kappos
*Director of the United States Patent and Trademark Office*